June 25, 1957     K. MILLER     2,796,779
KNURLING DEVICE
Filed July 29, 1953
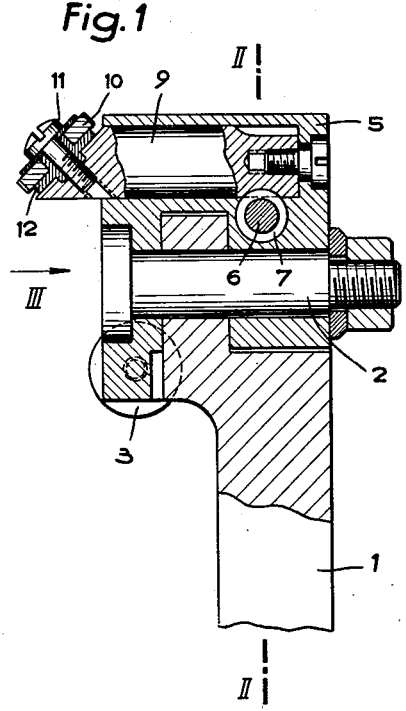
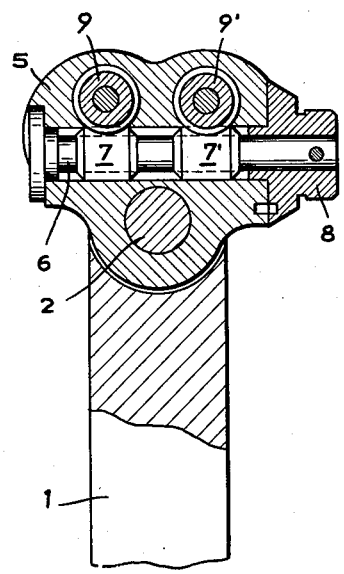
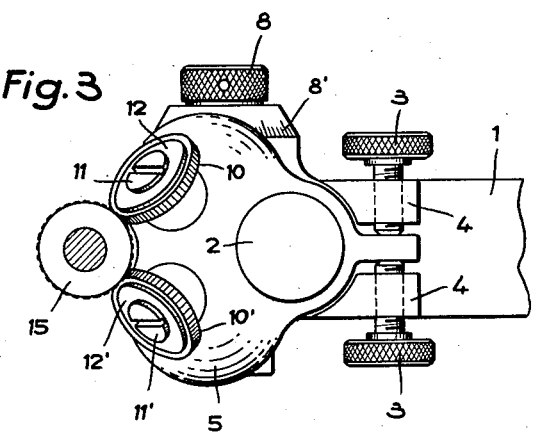

২,৭৯৬,৭৭৯

KNURLING DEVICE

Karl Miller, Innsbruck, Tirol, Austria

Application July 29, 1953, Serial No. 371,011

3 Claims. (Cl. 80—5.1)

The present invention relates to a knurling device for knurling the peripheral surface of a cylindrical object or objects and more particularly, to a device for cross-knurling, using paired rollers travelling alongside the cylinder.

It is common practice to use cross-hatching or knurling devices in which two cylindrical rollers of hardened steel are located and provided with grooves at an angle of 45° with respect to the axis of said rollers. When pressing said rollers against the surface of a rotating workpiece with sufficient pressure, said workpiece is turning thru its rotation the said knurling rollers whereby a knurled surface is formed on said cylindrical piece.

The afore-described procedure is a rolling process in which the compressive strength of the material worked on has to be overcome by the force applied to the tool pressing against same. In many cases special provisions have to be taken for preventing the work piece from cracking due to excessive pressure exerted by the tool.

Knurling devices also have been used which comprise two helically toothed knurling rollers engaging the work piece at diametrically opposite points their axes crossing that of the workpiece under an angle.

It is an object of the instant invention to provide a knurling device capable of adjustment for exactly symmetrical cross knurling and of adjustment to miscellaneous workpiece diameters.

It is another object of the instant invention to provide a knurling device which permits for simultaneous adjustment of both of its paired knurling rollers by means which commonly shift both of said rollers and therefore insure uniform groove-cutting in both directions.

It is a further object of the present invention to provide a knurling device which permits the production of a knurled surface at low presssure by means of chip-taking tools.

With the above objects in view the present invention mainly consists of a knurling device comprising a base part upon which a tool holder is mounted by means of a pivot pin provided in said base part to make an exact setting of the device possible, e. g. by opposite set screws located in said base part and bearing on said tool holder. The toolholder itself comprises two knurling rollers, two mounting shafts and an adjusting shaft, the mounting shafts being positioned in a generally parallel relationship within said tool holder, each of them carrying a knurling roller rotatably mounted on one of its ends, while the other ends of said shafts are geared to mesh with the said adjusting shaft; the latter is located transversely to the said mounting shafts in said tool holder and has gearings each of them mating with one of the said gearings on the mounting shafts, whereby rotation of said adjusting shaft causes the mounting shafts to rotate and thusly change the distances between the said rollers with the aim of adapting the device to miscellaneous diameters of workpiece, said tool holder being equipped with a dial operatively connected to said adjusting shaft to permit a reading of the actual position of the rollers.

The knurling rollers themselves are mounted at an angle of 45° with respect to the axis of the mounting shaft and have their serrations extending along their generatrices, thereby causing a chip-taking effect by detaching cuttings: a procedure suitable of lowering the pressure necessary to do the required work.

The invention, as well as to its materialization as to its working together with additional advantages thereof will appear from the following description of an illustrative embodiment thereof, supported by the accompanying drawing, in which:

Fig. 1 shows the device in central longitudinal, sectional elevation.

Fig. 2 in a sectional elevation taken along line II—II of Fig. 1, and

Fig. 3 in end view looking in the direction indicated by arrow III in Fig. 1.

Referring to the drawing, the knurling device is mounted on the slide of a lathe, of an automatic lathe or the like by means of a base part 1. It carries a tool holder 5 which is pivotable about pivot pin 2 and closely adjustable by means of two set screws 3, located in two threaded lugs 4 of base part 1 which serve to have the knurling rollers adjusted so as to exactly straddle the axis of the workpiece, whereby a symmetrical diamond or cross knurl will be attained.

An adjusting shaft 6 is mounted in tool holder 5 which shows two separate sections of worm gearing 7, 7' of opposite threading. Two mounting shafts 9, 9' mounting the knurling rollers 10, 10' are provided in a generally inter-parallel relationship and parallel to pivot pin 2 in the tool holder, transversely to the said adjusting shaft 6.

Each of the mounting shafts 9, 9' mounts a knurling roller at one of its ends which projects from tool holder 5, the other end of the said shafts 9, 9' showing a gearing each of said gearings mating with a co-ordinated gearing on the adjusting shaft. By rotating the adjusting shaft, e. g. by knob 8 fastened to said shaft, mounting shafts 9, 9' will revolve accordingly, whereby the distances between the said rollers will be changed. Dial 8' on the tool holder and operatively connected to said adjusting shaft indicates the actual position of rollers 10, 10', said rollers being mounted at an angle of 45° with respect to the axes of the said mounting shafts; the rollers revolve on bushings 12, each of them kept in position by a head screw 11 held in the bevelled end of mounting shafts 9, 9'.

To start the work the two knurling rollers are first approached to, or spaced from, one another by means of knob 8 until by means of dial 8' the correct distance with regard to the diameter of the actual workpiece is reached between the two knurling rollers. The rollers, then, are adjusted by means of the set screws 3, until a symmetrical and exact setting with regard to the center of the work piece and the centers of the lathe is reached. In cases where a shifting of the knurling rollers should be necessary they may be moved axially along the workpiece by adjusting the slide of the lathe, since the grooves, previously formed, then are guides of a travelling tool so that uniform grooves all over the surface to be knurled will be produced. The device permits for perfect cross-hatching and flat-knurling by applying merely low radial pressure when machining workpieces ranging from 5 to 200 mm. in diameter and of any metal possibly in consideration including cast iron, doing the work in a fraction of the time required heretofore for the same amount of knurling.

As may readily be seen the knurling device as per invention may be applied with or without travel along the workpiece; it is possible to start knurling flush with the front of a cylindrical blank. In such an event the rollers are kept approaching the center line of the blank radially until the crests of the teeth of the knurl are below the surface of the blank for a whole depth of knurling, the rollers being set against the flat front end of a workpiece. The knurling action may then be started rightaway, with the edges of the teeth of the knurling rollers scooping chips.

Where the knurling has to be started at a distance from the end of a workpiece, it is recommendable to go into the blank by rotation only and without travel; however, as soon as some depth is reached by pressure it is possible to start the regular chip-taking action by starting the travel of the tool.

Having now described in detail the gist of my invention and the art how to apply it (see the illustration shown by way of example) I do not wish to limit myself to the embodiment demonstrated above but what I claim and wish to protect by Letters Patent is:

1. A knurling device comprising a base part and a tool holder, a pivot pin for rotatably mounting said tool holder on said base part, means to adjust said tool holder about said pivot pin, said tool holder comprising two knurling rollers, two mounting shafts and an adjusting shaft, said mounting shafts positioned in a parallel relationship in said tool holder and one of said knurling rollers being rotatably mounted on one end of each shaft, the other end of said shafts being geared, said adjusting shaft located transversely to said shafts in said tool holder and having mating gearing with the said gearing on the said shaft whereby rotation of said adjusting shaft causes the mounting shaft to rotate and thusly change the distances between the said rollers, and a dial operatively connected to said adjusting shaft which indicates the actual position of the rollers.

2. The knurling device according to claim 1 wherein the said knurling rollers are mounted at an angle of 45° with respect to the axis of the said mounting shaft.

3. The knurling device according to claim 1 wherein the said knurling rollers have their serrations extending along their generatrices.

References Cited in the file of this patent

UNITED STATES PATENTS

| 60,067 | Sanford | Nov. 27, 1866 |
| 2,579,611 | Poorman | Dec. 25, 1951 |

FOREIGN PATENTS

| 6,213 | Great Britain | Jan. 21, 1893 |
| 588,850 | Great Britain | June 4, 1947 |